US011875211B1

(12) United States Patent
Cox et al.

(10) Patent No.: US 11,875,211 B1
(45) Date of Patent: Jan. 16, 2024

(54) SMART STICKERS: SENSORS FOR ENVIRONMENTAL CONDITIONS

(71) Applicant: United States of America as represented by the Secretary of the Navy, San Diego, CA (US)

(72) Inventors: Stephen Cox, San Diego, CA (US); Raymond Provost, San Diego, CA (US); Iryna Dzieciuch, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 17/848,754

(22) Filed: Jun. 24, 2022

(51) Int. Cl.
 *G06K 19/077* (2006.01)
 *G06K 19/07* (2006.01)
(52) U.S. Cl.
 CPC ..... *G06K 19/0776* (2013.01); *G06K 19/0717* (2013.01); *G06K 19/0723* (2013.01); *G06K 19/07773* (2013.01)
(58) Field of Classification Search
 CPC ................................................ G06K 19/0776
 See application file for complete search history.

(56) References Cited

U.S. PATENT DOCUMENTS

| 10,948,357 | B2  |   | 3/2021  | Cox      |                |
|------------|-----|---|---------|----------|----------------|
| 11,232,390 | B1  | * | 1/2022  | Leung    | G06K 19/0723   |
| 2001/0045361 | A1 | * | 11/2001 | Boone    | H01R 12/716    |
|            |     |   |         |          | 428/458        |
| 2015/0048844 | A1 | * | 2/2015  | Neikirk  | G01N 27/021    |
|            |     |   |         |          | 324/682        |
| 2017/0206446 | A1 | * | 7/2017  | Lesesky  | G06K 19/07764  |
| 2018/0003615 | A1 | * | 1/2018  | Kessler  | G01N 27/04     |
| 2019/0098432 | A1 | * | 3/2019  | Carlson  | G06Q 10/083    |
| 2019/0346313 | A1 | * | 11/2019 | Cox      | B33Y 10/00     |
| 2020/0026974 | A1 | * | 1/2020  | Chuang   | G06K 19/07749  |

* cited by examiner

*Primary Examiner* — Joseph H Feild
*Assistant Examiner* — Pameshanand Mahase
(74) *Attorney, Agent, or Firm* — Naval Information Warfare Center, Pacific; Kyle Eppele; Evan Hastings

(57) ABSTRACT

Smart sensors apparatus for detecting environmental conditions. The smart sticker apparatus includes a radio frequency identification tag comprising a chip and a loop antenna, the loop antenna being configured to transmit sensor information to an external reader, a plurality of sensors configured to provide environmental data, each of the sensors further comprising a substrate having a proximal side and a distal side, wherein the proximal side of the substrate is mounted to the chip, a conductive ink trace disposed on the distal side of the substrate, and a resin fully enveloping the radio frequency identification tag and partially enveloping the distal side of the substrate.

19 Claims, 5 Drawing Sheets

SMART STICKERS: SENSORS FOR ENVIRONMENTAL CONDITIONS

STATEMENT REGARDING FEDERALLY-SPONSORED RESEARCH AND DEVELOPMENT

The United States Government has ownership rights in this invention. Licensing inquiries may be directed to Office of Research and Technical Applications Naval Information Warfare Center Pacific, Code 72120, San Diego, CA, 92152; telephone (619) 553-5118; email: niwc_patent.fct@us.navy.mil, referencing Navy Case 112,194.

FIELD OF USE

The present disclosure relates generally to laboratory on a chip technology, and more specifically, a smart sticker sensor utilizing a radio frequency identification (RFID) tag and sensors for collecting and measuring environment conditions remotely.

BACKGROUND

Conventional system, apparatuses, and methods for measuring atmospheric and environmental conditions generally utilize sensors that require physical access, periodic visits, and frequent recalibration. These attributes typically pose a challenge for measuring and collecting atmospheric and environmental conditions in areas with minimal access. For example, electronic communication systems in maritime environments are often secure for their own protection. In another example, air handlers and its associated ducting typically expand through confined spaces, making the interior of those systems very difficult or impossible to reach. Due to maintenance, system checks, and safety issues, there is a need for an improvement to utilize a device or system for measuring atmospheric and environmental conditions in difficult to reach places.

SUMMARY

According to illustrative embodiments, a smart sticker apparatus, comprising a radio frequency identification tag comprising a chip and a loop antenna, the loop antenna being configured to transmit sensor information to an external reader, a plurality of sensors configured to provide environmental data, each of the sensors further comprising a substrate having a proximal side and a distal side, wherein the proximal side of the substrate is mounted to the chip, a conductive ink trace disposed on the distal side of the substrate, and a resin fully enveloping the radio frequency identification tag and partially enveloping the distal side of the substrate.

It is an object to provide a smart sticker that offers numerous benefits, including measuring and transmitting atmospheric and environmental conditions at a distance.

It is an object to overcome the limitations of the prior art.

These, as well as other components, steps, features, objects, benefits, and advantages, will now become clear from a review of the following detailed description of illustrative embodiments, the accompanying drawings, and the claims.

BRIEF DESCRIPTION OF THE DRAWINGS

The accompanying drawings, which are incorporated in and form a part of the specification, illustrate example embodiments and, together with the description, serve to explain the principles of the invention. Throughout the several views, like elements are referenced using like references. The elements in the figures are not drawn to scale and some dimensions are exaggerated for clarity. In the drawings.

DETAILED DESCRIPTION OF EMBODIMENTS

The disclosed apparatus below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other apparatus described herein as will be understood by one of ordinary skill in the art unless otherwise stated specifically.

References in the present disclosure to "one embodiment," "an embodiment," or any variation thereof, means that a particular element, feature, structure, or characteristic described in connection with the embodiments is included in at least one embodiment. The appearances of the phrases "in one embodiment," "in some embodiments," and "in other embodiments" in various places in the present disclosure are not necessarily all referring to the same embodiment or the same set of embodiments.

As used herein, the terms "comprises," "comprising," "includes," "including," "has," "having," or any variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of words such as "the," "a," or "an" are employed to describe elements and components of the embodiments herein; this is done merely for grammatical reasons and to conform to idiomatic English. This detailed description should be read to include one or at least one, and the singular also includes the plural unless it is clearly indicated otherwise.

As used herein, the term "component" refers to any component or sensor having an instrument configured to measure environmental conditions including, without limitation: a thermocouple, corrosion gauge, passive battery, biofouling or microbial detector comprising copper, Peltier junction, humidity indicator, strain gauge, sponge, air gap, polymer resistor.

Figure 1:
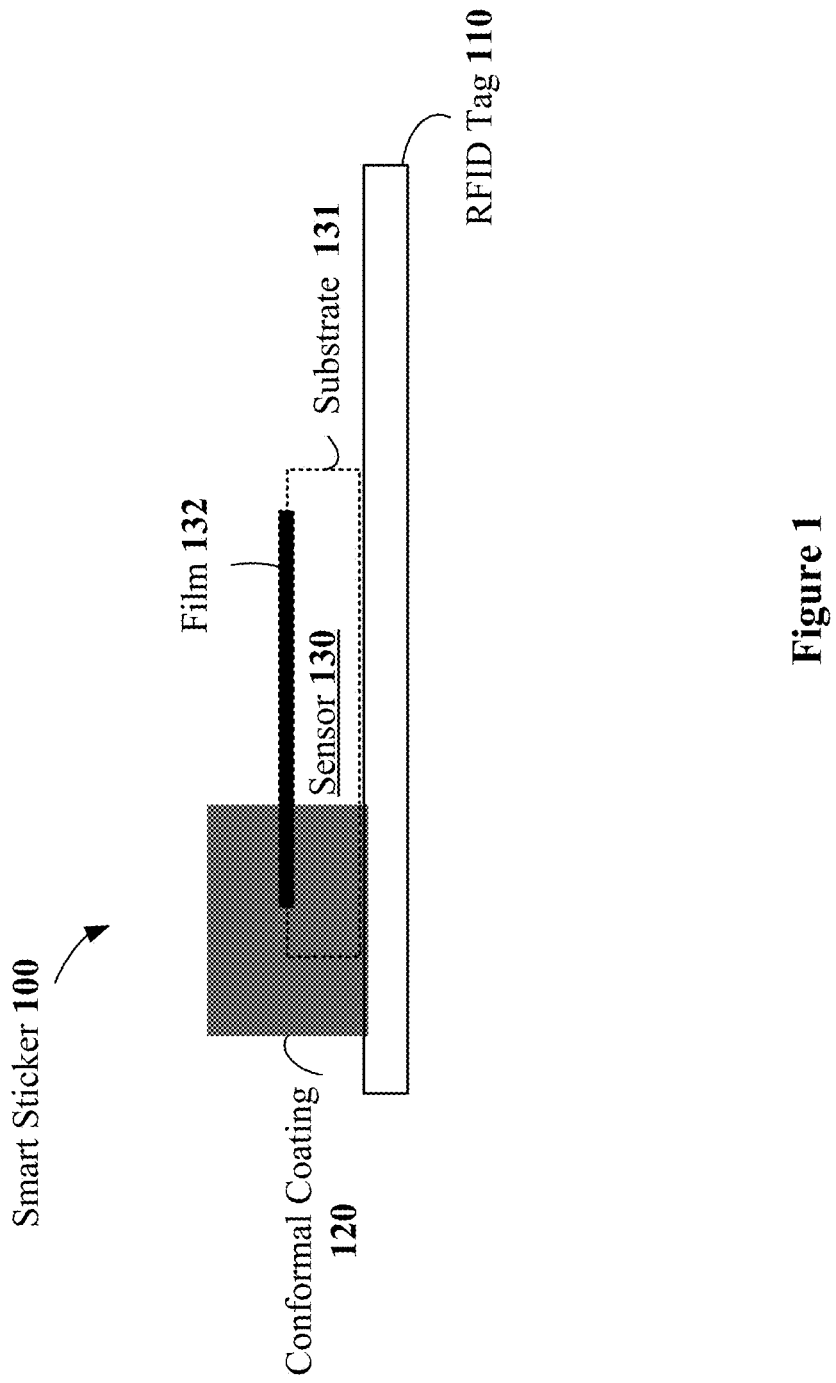
FIG. 1 is an illustration of an elevation side-view of one embodiment of a smart sticker.
Figure 4:
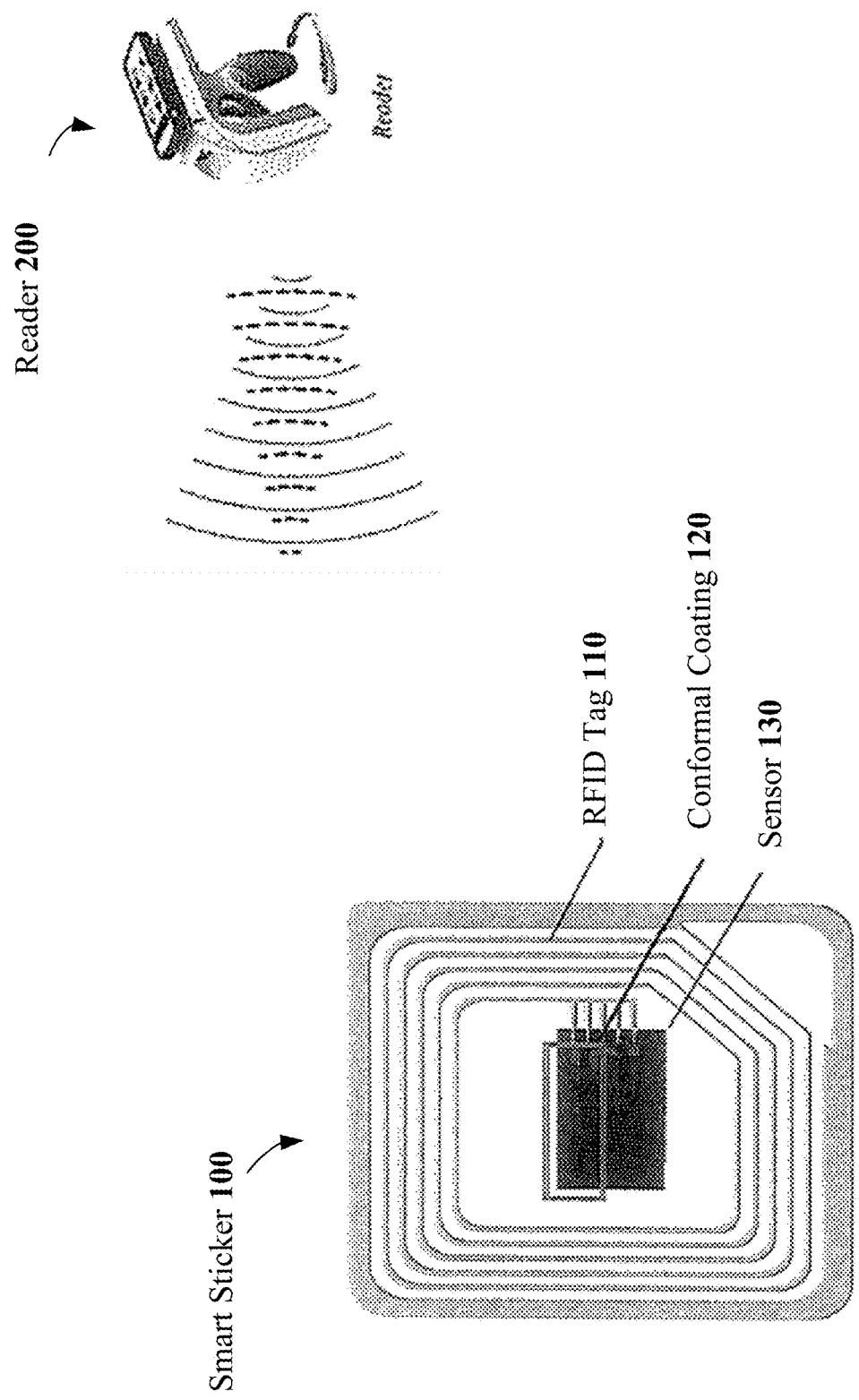
FIG. 4 is an illustration of a top-plan view of embodiments of a smart-sticker and a reader.

FIG. 1 is an illustration of a side view of one embodiment of a smart sticker 100. The smart sticker 100 may comprise: a radio frequency identification (RFID) tag 110, conformal coating 120, and sensors 130. Each sensor 130 may comprise: a substrate 131 and film 132. The smart sticker 100 may be physically mounted or adhered to a surface and may operate in any position where the film 132 or conformal coating 120 interfaces with atmospheric and environmental conditions. For example, in one embodiment, the smart sticker 100 may adhere to the interior of a communications unit, such that an embodiment of the film 132 may monitor the corrosive impact of the communication unit's environment. In another embodiment, the smart sticker 100 may be utilized aboard an oceanic vessel to monitor various conditions deep within the hull of the vessel. The smart sticker 100 may be configured to store data or transmit information to an external reader 200, capable of collecting the information from the smart sticker 100 remotely, as shown in FIG. 4. The range or distance at which the reader 200 may collect information may vary, depending on the distance at which electromagnetic waves may interrogate the smart sticker 100. This range or distance may also depend on where the smart sticker 100 may backscatter information to the reader 200. Example of such ranges or distances may include between approximately five to twenty feet.

Figure 2:
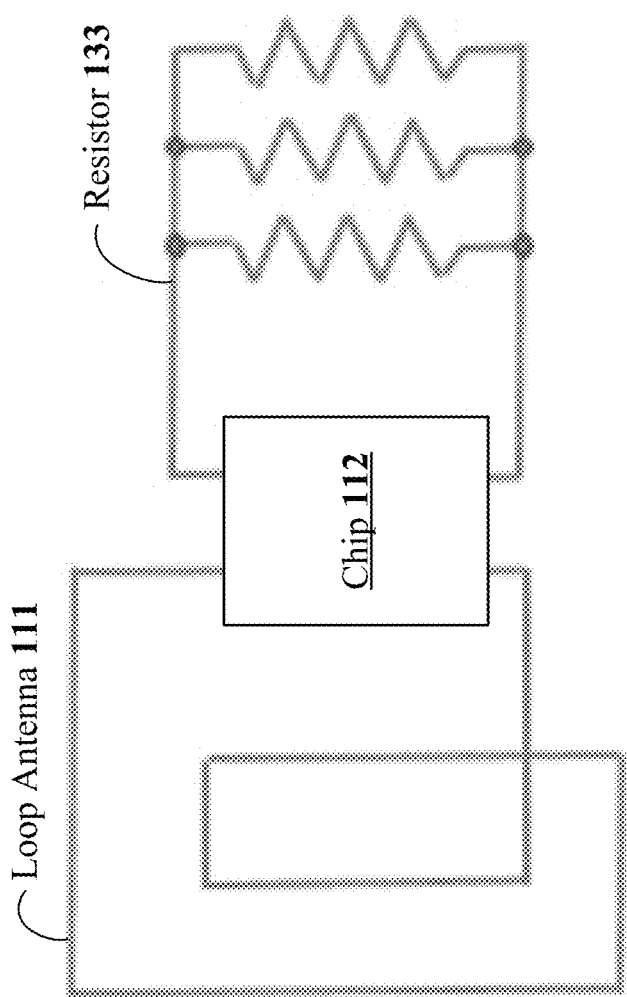
FIG. 2 is an illustration of a schematic of embodiments of a chip and sensor.

The RFID tag 110 is preferably configured to receive incident frequencies, relay power to onboard electronics, and backscatter information to the external reader 200. For example, in one embodiment, the RFID tag 110 may be a commercial, off-the-shelf (COTS) RFID tag and may comprise a loop antenna 111 and a chip 112, as shown in FIG. 2. In various embodiments, the RFID tag 110 may also comprise an active memory, such as a solid-state drive or data storage device. In other embodiments, the RFID tab 110 may further comprise a battery. For example, the RFID tag 110 may utilize a button cell battery, which may supply power for a data logger or multiple sensors 103, also shown in FIG. 2. In additional embodiments, the battery component may also be environmentally powered (e.g., solar powered).

In operation, embodiments of the RFID tag 110 preferably collect incident energies from an external reader 200 in order to power electrically collected sensors 130. Specifically, embodiments of the smart sticker 100 may perform as follows: First, interrogation energy may be emitted from a reader device. Second, electromagnetic energy may be harvested by the loop antenna 111. Next, a current may be induced in each of the sensors. Subsequently, the sensors 130 may measure various atmospheric or environmental conditions. Finally, information may be backscattered to the reader device 200. In various embodiments, the smart sticker 100 may not require a power source to determine a measurement of an environmental condition and may transmit that information to the reader.

In embodiments where the RFID tag 110 may include an active memory and a battery, these embodiments may sample and store atmospheric and environmental data while the smart sticker 100 is deployed. In an embodiment utilizing a corrosion sensor, the smart sticker 100 may record corrosion at an interval and store that information by drawing on the power from the battery. Such use with a commercial button-cell battery may, for example, provide power to operate the smart sticker 100 for six to twelve months.

The conformal coating 120 may be an electrically insulating, non-thermally conductive, and corrosion resistant film. The conformal coating 120 preferably envelops the RFID tag 110 and may envelop a portion of each of the sensors 130. Such enveloping protects the smart sticker 100 from atmospheric and environmental conditions, while exposing particular components for information collection, reading, or measurement. In one embodiment, the conformal coating 120 may be an epoxy resin. In other embodiments, the conformal coating may be manufactured with a silk screening applied above the conformal coating 120.

Each of the sensors 130 may be application specific integrated circuits. While FIG. 1 shows a single sensor 130, various embodiments may include a plurality of sensors 130. Each sensor 130 may comprise: a film 132 and a substrate 131. The substrate 131 is preferably capable of supporting the film 132 and may include a vinyl material. The film 132 may be metal printed or micro sputtered with conductive ink, or may be manufactured by etching.

FIG. 2 is an illustration of a schematic of one embodiment of a smart sticker 100. In this embodiment, the smart sticker 100 may comprise multiple sensors 130, each of which may be configured to detect atmospheric and environmental conditions. Each sensor 130 may be electrically coupled to the chip 112 and may comprise various components for measuring distinct environmental conditions. For example, an embodiment of a component may be a thermocouple configured to measure temperature based on an output voltage.

In another embodiment, the component may comprise a plurality of resistors 133 configured to measure corrosion. Here, the degree to which a metal has corroded may be determined by electrical resistance. Such resistance indicates the impact of corrosion in a given environment, and therefore may provide a corrosivity metric. Furthermore, the accuracy of a sensor's 130 corrosivity metric may be increased by integrating more than one resistor and/or the resistors having different resistances. For example, an embodiment of the film 132 may utilize multiple resistors 133, wherein the thickness of each resistor 133 corresponds to a specific resistivity. Thus, at varying thicknesses, each resistor 133, will corrode at a different rate, enabling a more precise determination of a corrosivity metric. In one embodiment, each of the plurality of resistors 133 has a distinct resistance associated with a millimeters per year.

Moreover, in additional embodiments, various types of sensors may be electrically coupled to the chip 112, including, but not limited to sensors discussed below:

A passive battery component comprising two distinct metals wherein their positioning generates electron flow.

A copper sensor component capable of measuring degradation due to biofouling or microbial corrosion.

A component comprising a Peltier junction for producing a temperature differential that generates electron flow.

A component comprising a humidity or dew point indicator where two closely positioned contacts may indicate the presence of water.

A strain gauge comprising at least one metal, wherein the resistive film is shaped like a bow-tie, adhesively bonded, and may measure, for example, mechanical stress/strain where the stretched, narrow bowtie is of higher resistance than the contracted, wider bowtie has a lower resistance. (See U.S. Pat. No. 10,948,357, which is incorporated by reference in its entirety).

A data recorder component configured to capture voice, keystroke, or other electronic data, comprising a storage, such as a solid-state drive. The data recorder may transmit information to an external reader upon interrogation. Further, the smart sticker 100 utilizing the data recorder component may be small, discrete, and unlikely to be discovered during visual inspection.

A sensor comprising at least one sponge. The sponge may be configured, such that when the sponge absorbs water, a current may be induced across the sponge (although no current generally passes through the sponge). This component may be used to detect the presence of water.

In another embodiment, a component may utilize plates separated by an air gap to measure flow and humidity in an airstream or liquid-flow through a pipe. This component may also be configured to record and measure fluid flow, cycle time and frequency of discharge/refill of a tank or liquid moment ("sloshing") in a tank. This data may be significant because the ballast management and trim ship board is critical, as fuel tanks can be depleted. Such component integrated into smart sticker 100 would give critical management information to ships command crew for improved and safe operation.

A sensor comprising a polymer resistor, wherein the resistance across the polymer is ideally none, but may collect enough ions to become increasingly resistive as metal oxides and salt accumulate on the polymer. As metal oxides and salt accumulate on the polymer, the polymer resistors begins to have a resistance, and the resistance across the polymer resistor decreases over time.

In one embodiment, all components of a sensor 130 may be exposed to measure environmental conditions. Such exposure may involve direct interface with environmental conditions, or without the interference of a conformal coating 120.

In another embodiment, at least one component may be fully enveloped by the conformal coating 120. This may protect and subject the component from atmospheric and environmental conditions. In this case, the component may measure the impact of atmospheric and environmental conditions to physical apparatuses also enveloped by the coating, which may include the RDIF tag 110, or substrate 131. Accordingly, measuring the impact of atmospheric and environmental through the coating may indirectly measure the lifespan of the coating. As the coating degrades, environmental measurements may shift from none to some discrete measurement. This measurement may also determine porosity of the coating as the atmosphere or environment impact the coating over time. Such measuring may also be applied to approximate degradation of protective coatings in similar environments in nearby systems.

Figure 3:
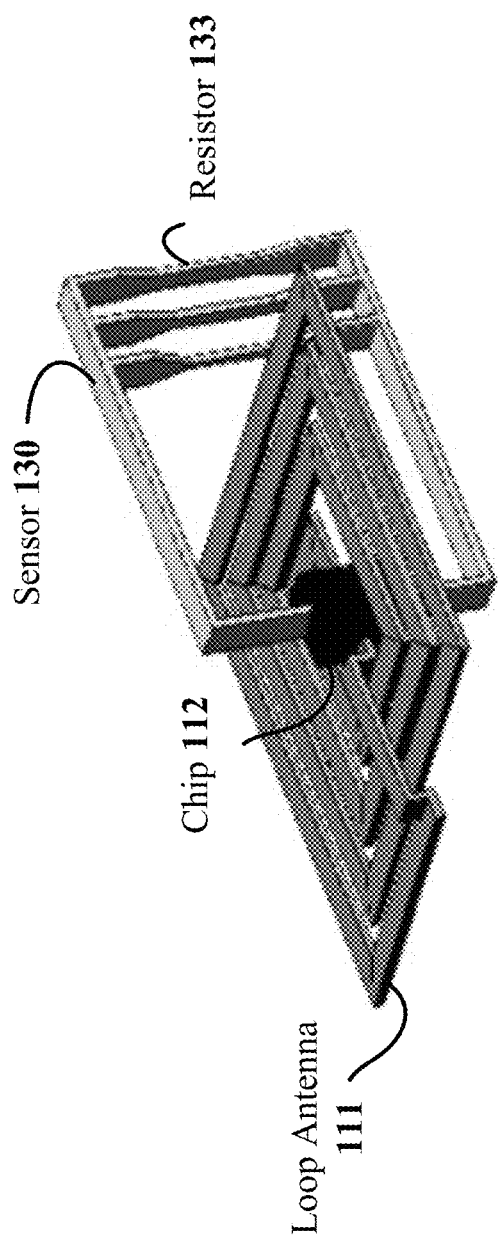
FIG. 3 is an illustration of an isometric-view embodiments of a chip and sensor.

FIG. 3 is an illustration of a perspective view of an electrical configuration of one embodiment of a smart sticker 100. Although FIG. 3 depicts a three-dimensional construction, it is noted that the electrical configuration of the smart sticker 100 may be implemented as a "flat", or near two-dimensional, construction.

Importantly, FIG. 3 shows one embodiment for a sensor 130 having multiple resistors 133 for measuring corrosion. In the embodiment shown, the sensor 130 may utilize three resistors 133, and each resistor may have a unique width across the resistors. In this manner, the width of the printed resistor may correlate with a particular resistance across the resistor (e.g., a wider width may have less resistance). In this embodiment, the sensor 130 may measure the resistance of all available resistors to determine a rate of corrosion. Utilizing multiple resistors may increase accuracy of a sensor due to the varied rate of degradation. While the smart sticker 100 is deployed in the environment with the multiple resistors 133 exposed, each resistor may experience corrosion, thereby increasing its resistance. Accordingly, the smallest resistor may corrode more quickly and loose more functionality than wider resistors. Therefore, the corrosion sensor 130 is generally most accurate when all implemented resistors are functional and degrade as each resistor is consumed with corrosion over time.

FIG. 4 is an illustration of embodiments of a smart sticker 100 and a reader 200. The reader 200 may be external or independent to the smart sticker 100. The reader 200 may also be used to project interrogation frequencies to the RFID tag 100, receive frequencies from the RFID tag 110, and display data collected by the sensors 130. The reader 200 may interrogate the RFID tag 110 remotely, such that direct, physical contact is unnecessary. Examples of such distances for interrogating a smart sticker 100 may include approximately five to twenty feet. Moreover, the reader 200 may collect and store sensor 130 data from multiple smart stickers 100 so as to collect an assortment of data on a given space's atmospheric and environmental conditions. Examples of sensor 130 data may include, without limitation, corrosivity metrics, time and date information, battery power, temperature, humidity, lifespan of conformal coatings, exposure to liquids or gases. In various embodiments, smart stickers 100 may also function in arrays in order to measure the atmospheric and environmental conditions of a broader space. For example, smart stickers 100 may be placed along an air duct to determine conditions through the duct. Additionally, an array of smart stickers 100 may each determine unique atmospheric and environmental conditions, so that a wider assortment of information is collected about the space, on the whole.

Figure 5:
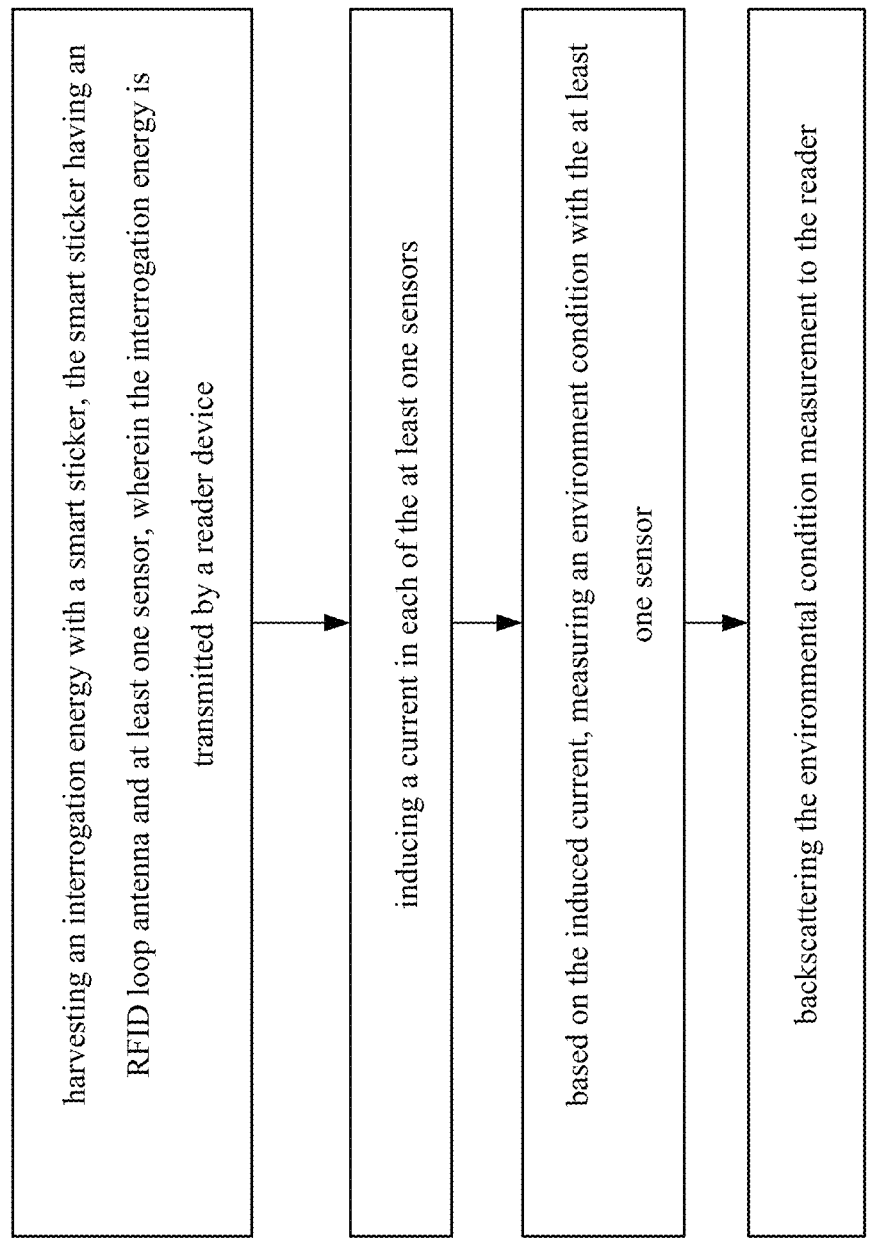
FIG. 5 is an illustration of a flow-chart depicting one embodiment of a method for wireless sensing environmental conditions.

FIG. 5 is an illustration of one embodiment of a method 20 for wireless sensing environmental conditions. As shown in FIG. 5, one embodiment of the method 20 may comprise the steps of: harvesting an interrogation energy with a smart sticker, the smart sticker having an RFID loop antenna and at least one sensor, wherein the interrogation energy is transmitted by a reader device, inducing a current in each of the sensors, measuring an environment condition with at least one sensor. In various embodiments, the method 20 may further comprise the step of measuring a plurality of environmental conditions with the at least one sensor. Finally, an embodiment of the method 20 may further comprise the step of storing the measurement of the environmental conditions in an active memory. Here, the active memory may be electrically-coupled to a power supply.

Based on the above description of Smart Stickers: Sensors for environmental conditions, it is manifest that various techniques may be used for implementing the smart sticker 100 without departing from the scope of the claims. The described embodiments are to be considered in all respects as illustrative and not restrictive. The apparatus disclosed herein may be practiced in the absence of any element that is not specifically claimed and/or disclosed herein. It should also be understood that the smart sticker 100 is not limited to the particular embodiments described herein, but is capable of many embodiments without departing from the scope of the claims.

What is claimed:

1. A smart sticker apparatus, comprising:
    a radio frequency identification tag comprising a chip and a loop antenna, the loop antenna being configured to backscatter sensor information to an external reader;
    a plurality of sensors configured to provide environmental data, each of the sensors further comprising:
        a substrate having a proximal side and a distal side, wherein the proximal side of the substrate is mounted to the chip;
        a conductive ink trace disposed on the distal side of the substrate wherein the conductive ink trace comprises a plurality of resistors configured to measure corrosion, and wherein each resistor has a unique width and collectively operate to determine a rate of corrosion; and
    a resin fully enveloping the radio frequency identification tag and partially enveloping the distal side of the substrate.

2. The smart sticker of claim 1, wherein each of the plurality of resistors has a distinct resistance associated with millimeters per year.

3. The smart sticker of claim 1, further comprising a capacitive sensor component electrically-coupled to the conductive ink trace.

4. The smart sticker of claim 1, further comprising:
a thermocouple component configured to measure temperature electrically connected to the conductive ink trace.

5. The smart sticker of claim 1, further comprising:
a battery component configured to generate electron flow electrically connected to the conductive ink trace.

6. The smart sticker of claim 1, further comprising:
a Peltier junction component configured to generate electron flow electrically connected to the conductive ink trace.

7. The smart sticker of claim 1, further comprising:
a humidity indicator configured to indicate the presence of water electrically connected to the conductive ink trace.

8. The smart sticker of claim 1, further comprising:
a strain gauge configured to indicate mechanical stress and strain electrically connected to the conductive ink trace.

9. The wireless sensor apparatus of claim 1, wherein the substrate comprises a vinyl material.

10. The wireless sensor apparatus of claim 1, wherein the conductive trace is a material selected from the group of materials consisting of: aluminum, copper, tin, and lead.

11. A smart sticker system, comprising:
a radio frequency identification tag comprising a chip and a loop antenna, the loop antenna being configured to backscatter sensor information to an external reader; a plurality of sensors configured to provide environmental data, each of the sensors further comprising:
a substrate having a proximal side and a distal side, wherein the proximal side of the substrate s mounted to the chip;
a conductive ink trace disposed on the distal side of the substrate, wherein the conductive ink trace comprises a plurality of resistors configured to measure corrosion, and wherein each resistor has a unique width and collectively operate to determine a rate of corrosion;
a resin fully enveloping the radio frequency identification tag and partially enveloping the distal side of the substrate; and
a reader device configured to collect environmental data.

12. A method for wireless sensing environmental conditions, the steps comprising:
harvesting an interrogation energy with a smart sticker, the smart sticker having an RFID loop antenna and at least one sensor, wherein the interrogation energy is transmitted by a reader device;
inducing a current in the at least one sensors;
based on the induced current, measuring an environment condition with the at least one sensor, wherein one of the at least one sensors is a conductive ink trace further comprising a plurality of resistors configured to measure corrosion, and wherein each resistor has a unique width and collectively operate to determine a rate of corrosion; and
backscattering the environmental condition measurement to the reader device.

13. The method of claim 12, further comprising the step of:
storing the measurement of the environmental conditions in an active memory, wherein the active memory being in electrical communication with a power supply.

14. The method of claim 12, wherein the environmental condition is a corrosivity metric, which further comprises a plurality of resistors, wherein each resistor has a unique width and collectively operate to determine a rate of corrosion.

15. The method of claim 12, wherein the environmental condition is further comprises temperature.

16. The method of claim 12, wherein the environmental condition is further comprises humidity.

17. The method of claim 12, wherein the environmental condition is further comprises mechanical stress.

18. The method of claim 12, wherein the reader is configured to store a history of determined environmental conditions.

19. The method of claim 12, wherein each of the plurality of resistors has a distinct resistance associated with millimeters per year.

* * * * *